United States Patent [19]
Pietrzykowski, Jr. et al.

[11] Patent Number: 5,334,246
[45] Date of Patent: Aug. 2, 1994

[54] DIP COAT PROCESS MATERIAL HANDLING SYSTEM

[75] Inventors: Stanley J. Pietrzykowski, Jr.; Alexander A. Antonelli, both of Rochester; John J. Darcy, III, Webster; Richard C. Petralia, Rochester; Mark C. Petropoulos; Peter J. Schmitt, both of Ontario; Patrick R. Shane, Rochester; Eugene A. Swain, Webster; Mark S. Thomas, Williamson; Alan D. Smith, Henrietta, all of N.Y.

[73] Assignee: Xerox Corporation, Stamford, Conn.

[21] Appl. No.: 995,491

[22] Filed: Dec. 23, 1992

[51] Int. Cl.⁵ .............................................. C25D 17/06
[52] U.S. Cl. ...................................... 118/69; 118/423; 118/503; 118/695; 118/705; 118/DIG. 12; 118/425; 269/51; 427/430.1
[58] Field of Search .............. 118/69, 423, 503, 142 S, 118/ DIG. 12, 425; 269/51; 427/430.1

[56] References Cited
U.S. PATENT DOCUMENTS

| | | | |
|---|---|---|---|
| 3,945,486 | 3/1976 | Cooper | 198/179 |
| 3,968,020 | 8/1993 | Nagano et al. | 118/503 |
| 4,512,869 | 4/1985 | Boccalatte | 204/300 EC |
| 4,788,786 | 12/1988 | Stur | 118/425 |
| 5,185,187 | 2/1993 | Yashiki et al. | 427/430.1 |

Primary Examiner—Robert A. Dawson
Assistant Examiner—David Reifsnyder
Attorney, Agent, or Firm—Denis A. Robitaille

[57] ABSTRACT

A dip coat process material handling system and method for coating multiple layers of material on a plurality of workpieces, in particular for producing a multi-layer optical photoconductive drum, wherein a plurality of pipes are suspended from a carrier pallet which transports the workpieces through a dip coat cell housing various dip coating stations. The system includes a load/unload station, vertical and horizontal transport systems for transporting the carrier pallet having workpieces loaded thereon to the various dip coating stations, a drying/cooling booth, and a return conveyor system. The invention allows complete dip coat processing to be completed in an in-line configuration while the workpieces are attached to the carrier pallet, thereby eliminating load/unload steps at each dip coating station to provide efficient and flexible processing of materials.

20 Claims, 6 Drawing Sheets

DIP COAT PROCESS MATERIAL HANDLING SYSTEM

The present invention relates to a material handling system for use in a dip coating process, and more particularly, relates to a dense dip coating process system for use in manufacturing a plurality of multi-layer optical photoconductive members in a continuous in-line configuration.

Electrostatographic imaging systems, which are well known, involve the formation and development of electrostatic latent images on a photoconductive surface, or a so-called photoreceptor which may typically be embodied in in the form of a photoconductive drum. Many known photoreceptors, having various characteristics, can be selected for incorporation into the electrostatographic imaging system, including, for example, photoreceptors comprising photoconductive insulating materials deposited on conductive substrates, as well as photoreceptors having a thin barrier layer or film of aluminum oxide situated between a substrate and a photoconductive composition. In the latter exemplary photoreceptor, the barrier layer is primarily provided for the purpose of preventing charge injection from the substrate into the photoconductive layer subsequent to charging since it is known that charge injection can adversely effect the electrical properties of the photoreceptor compositions involved.

Numerous different optical photoreceptors as well as other photoconductive devices suitable for use in electrostatographic machines are known, including, for example, photoconductive drums which comprise a homogeneous coating layer of a single material such as vitreous selenium deposited onto a support substrate or which may comprise multiple layers including a composite layer having a photoconductive material coated onto other material layers. One type of composite photoconductive layer used in electrostatographics is illustrated in U.S. Pat. No. 3,121,006 which describes a number of layers comprising finely divided particles of a photoconductive inorganic compound dispersed in an electrically insulating organic resin binder. In its present commercial form, the photoconductive layer contains particles of zinc oxide uniformly dispersed in a resin binder and coated on an aluminum drum substrate. Other multi-layered photoconductive devices comprising a photogenerating or charge generating layer and a charge transport layer deposited on a conductive substrate have also been disclosed in the art, as for example, in U.S. Pat. No. 4,265,990. Further, U.S. Pat. No. 4,251,612 describes a multilayer photoreceptor containing a hole injecting layer, a hole transport layer, a photogenerating layer, and a top coating of an insulating organic resin. The disclosures of each of these patents are incorporated in their entirety by reference herein.

While the above-described photoconductive devices are suitable for their intended purposes, there continues to be a need for the development of improved devices, in particular multi-layered devices, which not only generate acceptable images, but which can be repeatedly used over a number of imaging cycles without deterioration thereof due to the machine environment or other surrounding ambient conditions. Moreover, there continues to be a need for improved methods of manufacturing such multi-layered photoreceptive members.

Dip coating of hollow cylindrical members such as, for example, a pipe for forming a photoconductive drum has conventionally been carried out by sequentially transporting, via automated conveyors, a plurality of drums into independent coating booths separated by driers and cooling zones. In a typical system, transport pallets containing as many as four substrate pipes are received from a final pipe cleaning station along an assembly line and sequentially transferred into three coating booths, one for each of the following coating layers: an undercoating layer (UCL); a charge generating layer (CGL); and a charge transport layer (CTL). Three drying/cooling zones follow each coating booth and, finally, a load/unload robot is utilized, where each coated drum is removed from the assembly line. Each of the three coating booths contains an indexing mechanism for rotating the pipes through a series of stations for applying the respective coating material, each coating booth containing a pallet/pipe transfer station, a dip coating station, a flash-off station, and a bottom edge wipe station.

The operation of the system described above proceeds in the following manner. Initially, two transport pallets of four pipes each are transported along a conveyor to the pallet/pipe transfer station where the pipes (eight at a time) are raised up from the transport pallets for removal and transfer to the indexing machine. The indexing machine grasps each pipe from the inside diameter by means of a chucking device for carrying the pipes to each station in the particular coating booth. After receiving the pipes at the pallet/pipe transfer station, the indexer rotates sequentially in 90° increments to deliver the pipes to each processing station. The pipes are first delivered to the dip coating station where a plurality of individual dip tanks are raised around each pipe for receiving each pipe to individually dip coat each pipe. In this manner, the dip tanks are raised around the pipes, come to rest with the pipes therein, and finally lowered in accordance with a specific time and velocity profile for providing a coating having a predetermined thickness for the particular layer being applied to the pipe.

After the pipes have been dipped for a predetermined amount of time, the dip tanks are lowered away from the pipes and the indexing mechanism rotates to transport the pipes to a flash-off station. At this station, solvent vapor from the coating formula is allowed to dissipate or "flash-off". After a sufficient flash-off time, the indexer once again rotates to a bottom edge wipe station. At this station, a boundary area of approximately 11 mm along the bottom rim of the coated pipe is cleaned off by means of a combination solvent and brush contact to remove the coating layer deposited thereon. This bottom edge wipe step is necessitated by the fact that the bottom edge portion of the drum is used as an electrical contact point when placed in the electrostatographic machine and, moreover, because the coated pipe is subsequently removed from the indexer and placed on a transport pallet for transport to the next processing a subsequent processing station.

Thus, upon completion of the bottom edge wipe process step, the bottom edge solution tank is lowered away from the pipes and the indexer is rotated another 90° to return the pipes to the pallet/pipe transfer station. At this stage, the pipes are lowered back onto the transport pallets, returned to the automated conveyor and transported along the conveyor to a drying and cooling station. As described, this process is repeated for each of three coating layers dip coated onto each hollow pipe for producing a drum-type photoreceptive member.

The above-described dip coating system and process has many disadvantages. The primary disadvantage of this system involves the fact that each step in dip coating a layer of material onto a pipe includes a transfer step wherein the pipes are shifted from the transport pallets on the automated conveyor into each coating booth and subsequently again shifted from each coating booth back to the transport pallets. In fact, it is this very step of transferring each pipe back to the transport pallet that necessitates the bottom edge wipe process at each coating booth for preventing contamination of this coating layer as well as for preventing residual coating material to be deposited on the transfer pallet. Clearly, since this bottom edge wipe process is separately repeated for each layer of the dip coating process, the elimination of this step is desirable and would be greatly advantageous in increasing production throughput, in decreasing overall production facility cost and in ultimately decreasing product cost.

Another major disadvantage of the dip coating process system presently in use concerns real estate requirements; that is, in the known system in present use, each dip coating booth must be separately laid out and separated by an independent drying and cooling station for dip coating an individual layer on each workpiece. It is evident that each separate and independent dip coating booth and oven/cooling station requires an incremental addition to physical space. This is not only important in terms of the size requirements of the manufacturing facility, but is also Important in determining the cost of the facility and, necessarily, the ultimate cost of the photoreceptive drums produced therein. This problem is exacerbated by the fact that the entire assembly line facility including each booth and the conveyor system is preferably housed in a class 100 clean room enclosure.

A further disadvantage of the above-described system results from the requirement for separate dip coating booths including separate and independent hardware to yield essentially the same operation at each booth. In the described system, the indexing mechanism provides essentially the same function in each dip coating booth: transporting the pipes from the pallet/pipe transfer station to the dip coating tank; from the dip coating tank to the flash off station; from the flash-off station to the bottom edge wipe station, and finally, from the bottom edge wipe station back to the pallet/pipe transfer station. It would be advantageous to consolidate these repetitive steps into a singular apparatus which could transport a plurality of drums through each dip coating step of the multilayered dip coating process.

Another disadvantage of the prior known dip coating system concerns solvent abatement problems related to the bottom edge wipe station described hereinabove. The bottom edge wipe station typically requires the use of toxic solvents such as, for example, methylene chloride. These solvents must be removed and disposed of in accordance with strict governmental guidelines through a process that is highly capital intensive. It is an objective of the present invention to eliminate the bottom edge wipe station and process now in use so as to eliminate the solvent abatement issues related thereto. This goal not only provides cost benefits, but results in environmental rewards as well.

Yet another disadvantage of the above-described system is related to the raising and lowering of the dip tanks and the bottom edge wipe tanks at each respective station. Each of these tanks are extremely heavy when filled with the liquid solvents involved in the dip coating process. Raising and lowering these tanks requires expensive, powerful and robust hardware. The added expense of this costly system is exacerbated by the fact that separate raising and lowering systems are required for each dip tank and each bottom edge wipe system in each dip coating booth. Clearly, it would be advantageous to eliminate such hardware.

Various approaches and solutions to the problems associated with dip coating systems and processes have been disclosed. The following disclosures may be relevant to various aspects of the present invention:

U.S. Pat. No. 4,512,869
Patentee: Boccalatte
Issued: Apr. 23, 1985

U.S. Pat. No. 3,945,486
Patentee: Cooper
Issued: Mar. 23, 1976

The relevant portions of the foregoing disclosures may be briefly summarized as follows:

U.S. Pat. No. 4,512,869 discloses an overhead conveyor installation for motor vehicle bodies which is particularly suited for use in electrophoresic paint lines wherein the conveyor installation includes a loading station for loading body carriers with respective vehicle bodies, each body carrier comprising front and rear dependent arms arranged to be introduced through the windshield and rear window openings of a vehicle and body and engaged with internal apertures preformed in the body. The loading station includes a vertically movable structure for lowering the body carrier down over a body to be picked up, and various actuators arranged to control engagement and locking of the body carrier arms.

U.S. Pat. No. 3,945,486 discloses a container supporting and transporting device for releasably supporting and transporting rigid openmouthed containers by engaging the interior surface of the container mouth with an inflatable elongated elastomeric diaphragm, including means for inflating and deflating the diaphragm. The apparatus of that invention is particularly useful in suspending and conveying heated glass bottles through various processing stages wherein various coatings are applied to the outer surfaces of the bottle.

In accordance with one aspect of the present invention, there is provided a material handling system for dip coating a plurality of workpieces to deposit a layer of coating material thereon, comprising carrier means for receiving the plurality of workpieces, a dip station for depositing a layer of coating material onto each of the plurality of workpieces, first transport means for transporting the carrier means in a first plane to position the workpieces over the dip station, and second transport means for transporting the carrier means in a second plane substantially perpendicular to the first plane to dip the workpieces into and out of the dip station with the workpieces attached to the carrier means.

In accordance with another aspect of the present invention, there is provided a process for dip coating a plurality of workpieces in a material handling system including a dip station for depositing a layer of coating material onto each of the plurality of workpieces, comprising the steps of loading the plurality of workpieces onto a carrier pallet at a load/unload station, transporting the carrier pallet in a first plane along a first transport means to position the workpieces over the dip station, and transporting the carrier pallet in a second plane along a second transport means to dip the workpieces into and out of the dip station with the workpieces attached to the carrier means.

These and other aspects of the present invention will become apparent from the following description in conjunction with the accompanying drawings, in which.

Figure 1:
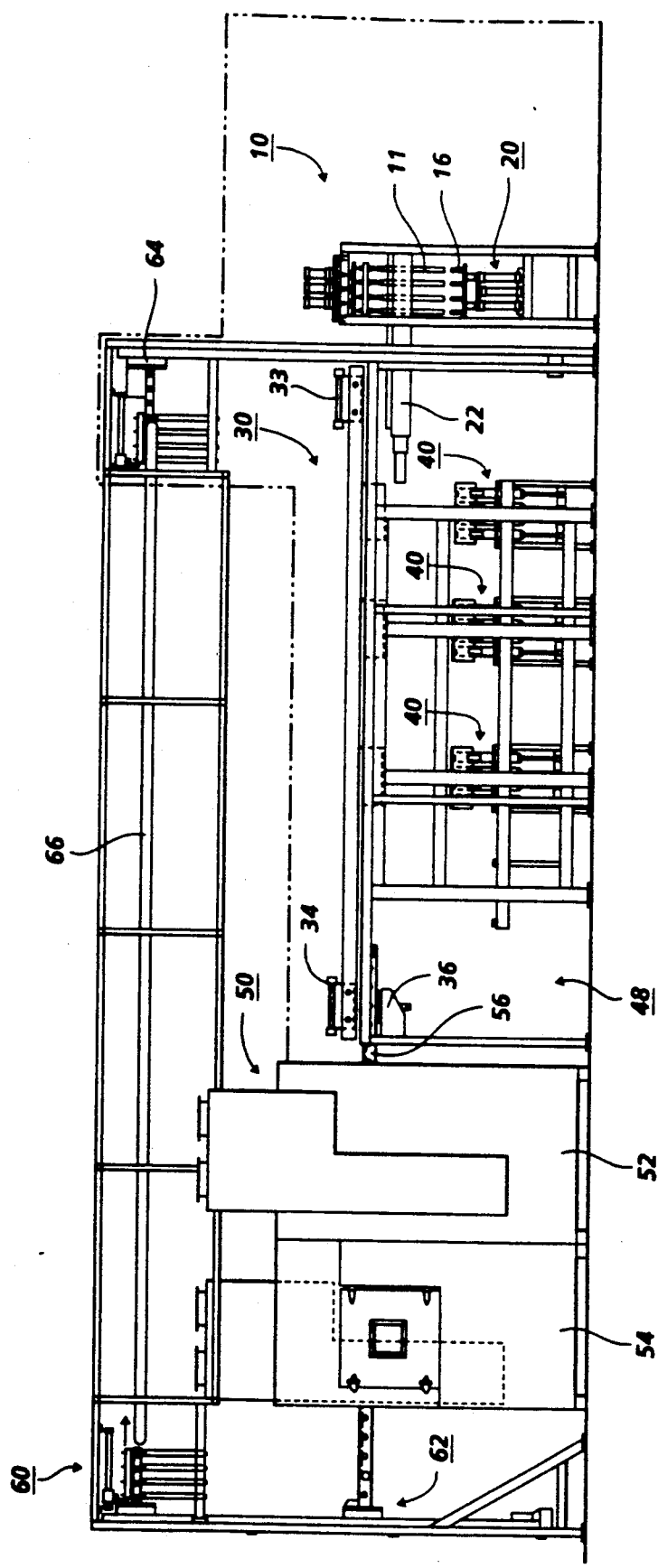
FIG. 1 is a schematic side view showing a dip coat process material handling system in accordance with an embodiment of the present invention.
Figure 2:
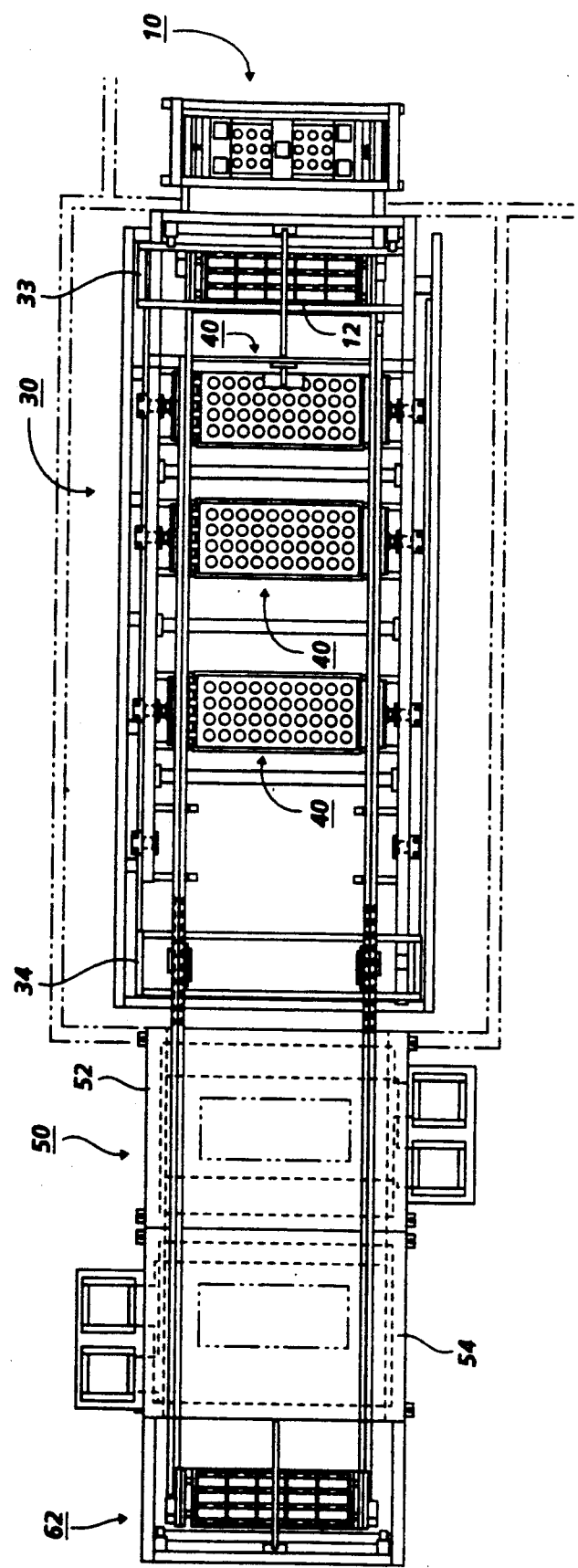
FIG. 2 is a schematic plan view showing the dip coat process material handling system of FIG. 1.

Referring now to the drawings in detail, reference Is initially made to FIGS. 1 and 2 wherein a dip coat process material handling system in accordance with the present invention is illustrated. The dip coat process material handling system of the present invention comprises a load/unload station 10, a dip coating cell 30, and a drying/cooling booth 50. As can be seen in FIG. 1, the dip coat process material handling system of the present invention may also include a return conveyor assembly, generally designated by reference numeral 60. It will be noted that the load/unload station 10, the dip coating cell 30, and the drying cooling booth 50 are arranged in an in-line configuration, and that each are provided with transport means, as will be discussed in detail herein, for transporting articles to be dip coated from right to left through the various stations of the present dip coat process material handling system.

For the purposes of describing the present invention, the functions of the individual processing locations 10, 30 and 50, insofar as they vary from one another, will be described individually, except insofar as all of the modules cooperate to provide a dip coat process material handling system that may be designed to fulfill a wide variety of needs. Thus, it will be understood that it may be desirable in some instances to use, for example, two or more process handling systems as shown in FIGS. 1 and 2, or variations thereof, in an in-line configuration to provide a streamlined and efficient process material handling system. As such, it will be understood that the description that follows is merely intended to describe a possible embodiment of the present invention, and the invention should not be deemed to be limited to the particular embodiment described.

Moving now to a description of the load/unload station of FIGS. 3 and 4, the dip coat process material handling system of the present invention will be described in logical sequential order, proceeding through the system from start to finish. Initially, articles to be dip coated, referred to generally herein as workpieces and in this particular case, hollow pipes 11, are placed onto a load pallet 16. The workpieces may be individually placed on the load pallet 16 or may be delivered to the load/unload station previously positioned on a load pallet through a prior operation, such as, for example, a cleaning process. The load pallet 16 includes a plurality of demarcated positions designed to receive the workpieces in a configuration which dimensionally corresponds with a carrier pallet 12 positioned superjacent to the load pallet 16. The carrier pallet 12 includes a plurality of mandrels 14 each having a chucking device 15 associated therewith for receiving individual workpieces thereon. In a preferred embodiment, the carrier pallet 12 incorporates an array of 40 mandrels in a 4×10 matrix array so as to grasp 40 workpieces from the load pallet 16 for carrying by the carrier pallet 12, and for simultaneously disengaging the workpieces from the carrier pallet 12 for being deposited back on the load pallet 16 after processing is complete.

The load/unload station 10 also includes a chuck engage/disengage apparatus 18 and a load pallet vertical lift 20 which cooperate with the carrier pallet 12. The chuck engage/disengage apparatus 18 includes a contact plate 19 for pressing against the top of each mandrel 14 to simultaneously actuate each chucking device 15. Thus, the chuck engage/disengage apparatus 18 and the load pallet vertical lift 20 operate interactively with the workpieces, to raise and load the workpieces, onto the carrier pallet 12, as well as to lower and unload the finished workpieces from the carrier pallet 12. This load/unload operation is diagrammatically illustrated in FIGS. 3 and 4 by the contrasting offset positions of halves of the load pallet 16. Finally, the pallet load/unload station 10 also includes a carrier pallet horizontal transport 22 for transporting and transferring a loaded carrier pallet 12 from the load/unload station 10 to the dip coating cell 30.

Figure 3:
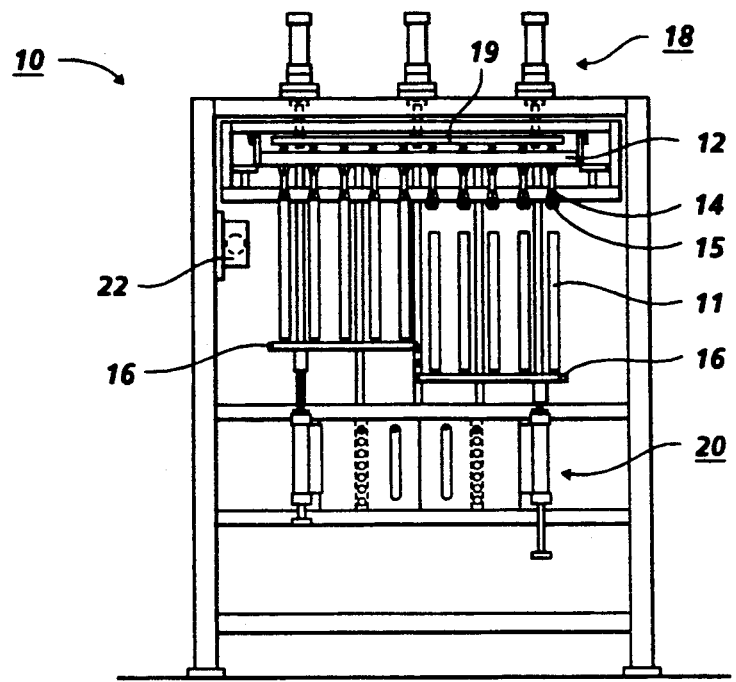
FIGS. 3 and 4 are schematic front and side views, respectively, illustratively showing the operation of the load/unload station in the dip coat process material handling system of FIG. 1.
Figure 4:
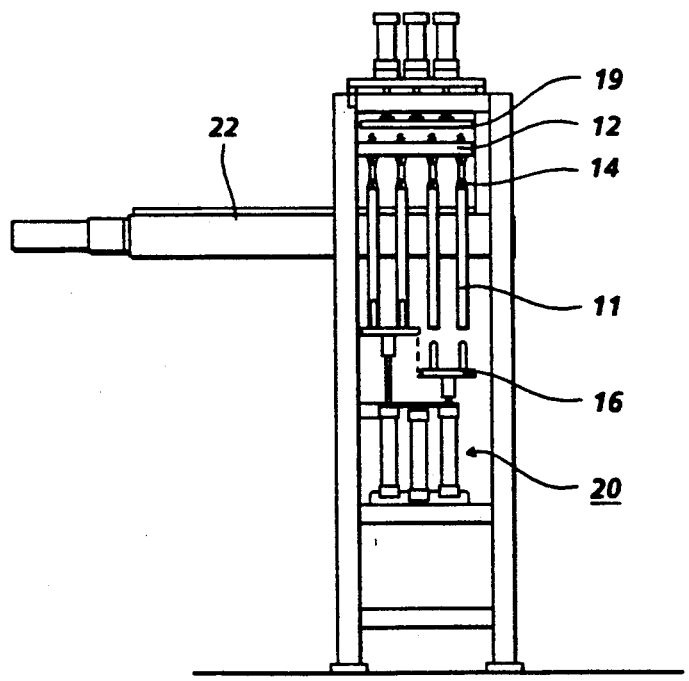

Since the present invention is directed toward dip coating of hollow pipes for manufacturing optical photoconductors, the mandrel 14 and chucking device 15 assembly shown in FIGS. 3 and 4 is specifically designed to meet specific performance requirements associated with the present system. A detailed description of various novel mandrels and chucking devices suitable for use in the present invention are provided in patent applications assigned to common assignee and filed on even date with the present invention, identified as follows Ser. No. 996,430 now U.S. Pat. 5,320,36 entitled "MANDREL WITH EXPANDABLE HIGH TEMPERATURE ELASTOMERIC POLYMER DISK AND PROCESS FOR USING MANDREL"; Ser. No. 995,489 entitled "SELF ADJUSTING MANDREL WITH EXPANDABLE ELASTOMERIC DISK AND PROCESS FOR USING MANDREL; Ser. No. 996,227 entitled "LOW ENERGY MANDREL AND PROCESS FOR USING MANDREL"; Ser. No. 996,431 entitled "MANDREL WITH FLARED, DISH SHAPED DISK AND PROCESS FOR USING MANDREL". The cited patent applications are hereby incorporated by reference into the present invention. It will be understood, however, that the present invention can be incorporated to process a variety of different articles such that the carrier pallet 12 can be equipped with various types of fixtures for engaging and disengaging the workpieces. In the specific chuck design incorporated into the present invention, the chucking device 15 is designed to engage with each pipe along its inside diameter by applying pressure against a resilient member located opposite the chucking device. By engaging the pipe along the inside diameter, the chucking device creates a fixed volume cavity within the pipe for regulating the incoming interior solution level. This specific chuck design also prevents contamination of the outside diameter of the pipe by eliminating chuck and pipe interaction along the exterior periphery thereof.

Figure 5:
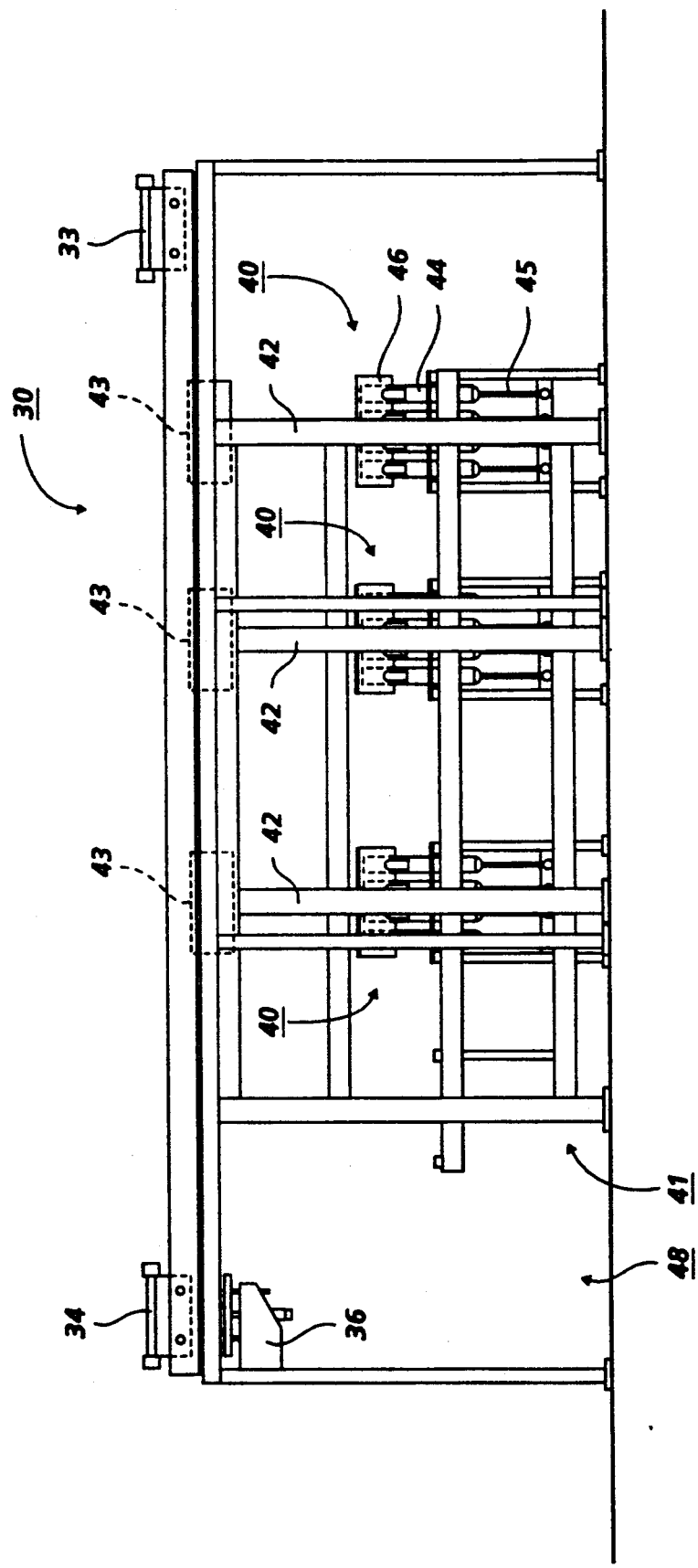
FIG. 5 Is a schematic side view showing the dip coating cell of the dip coat process material handling system of FIG. 1.

The dip coating cell 30 will now be described with reference to FIGS. 5 and 6A. It is noted that, the description, as well as the claims, of the present invention, as provided herein, make frequent use of the terms "horizontal" and "vertical". It is intended that these terms be used quite literally throughout the description as well as the claims, such that "horizontal" defines a plane substantially parallel to the horizontal and "vertical" defines a plane substantially perpendicular to the horizon. Dip coating cell 30 houses a plurality of dip stations 40 and comprises a dip horizontal transport system 32 including two horizontal transport carts 33 and 34 as well as a plurality of dip vertical transport systems 42 configured in alignment with each dip station 40. The dip horizontal transport system 32 provides the capability of transporting the carrier pallet 12 in a substantially horizontal plane in a continuous, in-line manner, while each dip vertical transport system 42 provides the capability of transporting each carrier pallet 12 in a substantially vertical plane for placing the workpieces into and out of each dip station 40. Each dip vertical transport system 42 also includes a transfer system 43 for transferring the carrier pallet 12 between the horizontal transport system 32 and each respective vertical transport system 42. As shown most clearly in of FIG. 6, the transfer system 43 includes a movable arm for engaging with the carrier pallet 12 to raise and lower the carrier onto and off of the horizontal transport cart 33. In operation, the horizontal transport system via transport unit 33 or 34 transports a loaded carrier pallet 12 into position In alignment with a particular vertical transport system 42. The transfer system 43 is then activated to lift and support the carrier pallet 12 as the transfer cart 33 is moved aside so that the carrier pallet 12 can be lowered and raised by the vertical transport system 42. The vertical transport system 42 then transports the carrier pallet 12 along with the workpieces loaded thereon into the associated dip station 40. After the dip process is completed the transport and transfer process is reversed so as to reposition the carrier pallet 16 onto a transport cart 33 or 34. This process is diagrammatically illustrated in FIG. 6 by the contrasting offset position of the load pallet 16.

In the preferred embodiment of the present invention described herein, the dip coating station includes three dip stations 40: a first dip station for providing an undercoating layer; a second dip station for providing a charge generating layer; and a third dip station for providing a charge transport layer. However, it will be understood by those of skill in the art, that the dip coating cell 30 can be expanded or reduced to provide as many dip stations 42 as required by the specific dip coating process being implemented. Alternatively, or additionally, the dip coating cell 30 can be expanded to provide additional dip stations including various other solutions for permitting variations in dip coating solutions which could permit co-processing of different products in the process material handling system of the present invention. For example, with reference to FIG. 5, an additional dip station and corresponding dip vertical transfer system can be installed at the end of the dip coating station, generally indicated by reference numeral 41 as an auxiliary dip station. For additional flexibility, each dip station 40 can be mounted onto a transport truck (not shown) to allow relatively simple interchangeability of dip coating solutions within the dip coating cell 30.

Figure 6:
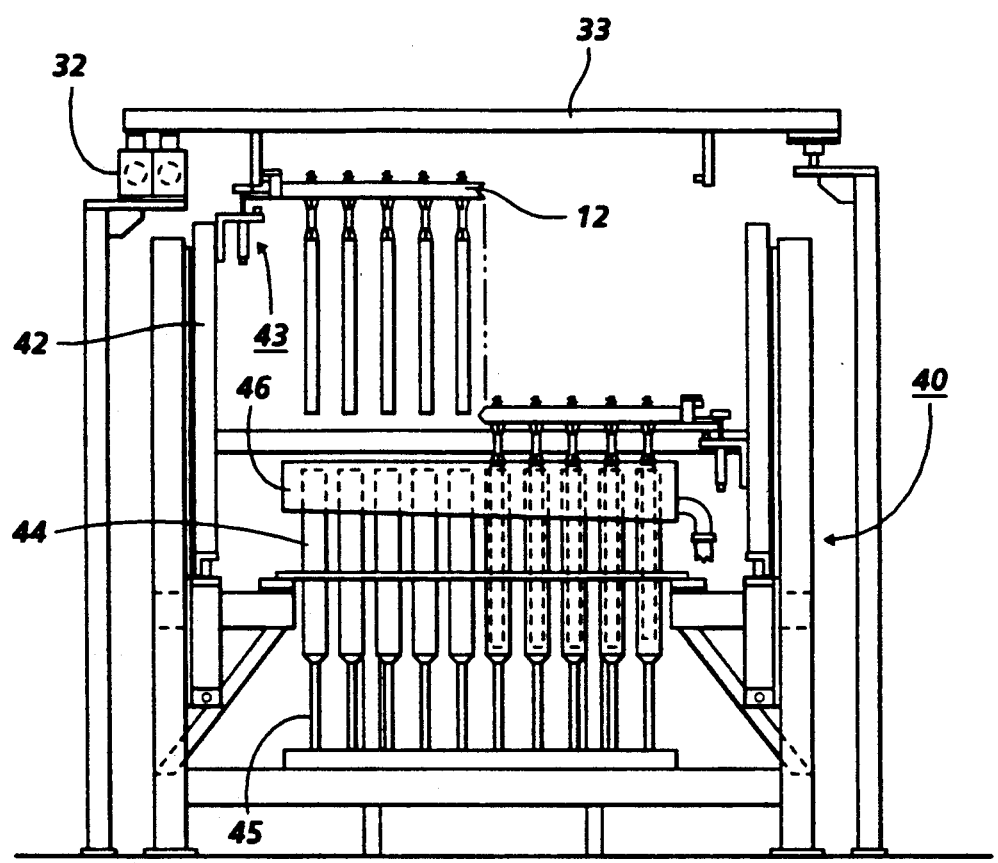
FIG. 6 is a schematic front view illustratively showing the operation of the dip coating station in the dip coat process material handling system of FIG. 1.

In a preferred embodiment as shown in FIG. 6, each dip station comprises a plurality of discrete dip tanks 44 for receiving an individual workpiece therein. Each dip tank 44 is provided with an infeed nozzle 45, preferably located at the base of each tank 44, and is further mounted to an overflow retrieval vessel 46 located adjacent the opening of the dip tank 44. The infeed nozzle 45 and overflow retrieval vessel 46 are coupled to a solution recirculation system (not shown) for continuously recirculating the solution in the dip tanks 44 through a filtering and environment control system such that the solution in each dip tank 44 can be filtered and maintained at a constant temperature and viscosity. Each dip tank 44 may also include a water jacket or other system for maintaining constant temperatures within the dip tank. This dip station 40 design, including individual dip tanks 44 enhances the capability of each dip station 40 system to maintain uniformity in the solution being deposited on the workpiece and decreases the surface area from which solvents may be dissipated.

Each dip vertical transport system 42 includes a selectively variable drive system for selectively varying the velocity at which the carrier pallet 12 is raised and lowered. Thus, the carrier pallet 12 can be lowered at a first fixed velocity to a point where the workpieces are just above the dip tanks 44 and then lowered at a second predetermined fixed velocity into each dip tank 44. The dip vertical transfer system 42 is brought to a stop for a predetermined period of time at a lower limit to allow the solution in each dip tank to come to a state of equilibrium while the workpiece is suspended at a position corresponding to the level at which the coating material is to be deposited onto the workpiece. Thereafter, the dip vertical transfer system 42 raises the workpieces out of the dip tank 44 at a predetermined velocity corresponding to the appropriate specification of the dip coating process as determined by the thickness of the desired coating, the viscosity of the coating solution, and other factors and then back to the dip horizontal transfer system 32 at another selected speed. Thus, the workpieces will preferably be raised slowly from the dip tanks 44 at a particular velocity which is determined to prevent the formation of air bubbles or other inconsistencies in the coating and, upon complete removal of the workpiece from the dip tank 44, the workpieces will be transported at a second, preferably increased velocity, to bring the carrier pallet 12 into alignment with the dip horizontal transfer system 32 for transfer thereto.

Dip coating cell 30 may also comprise a flash-off station 48 for solvent vapor removal. No vertical transport system is required at the flash-off station as the workpieces are merely permitted to remain idle for a predetermined period of time to allow vapors to dissipate. The flash-off station 48 may include a blower system (not shown) for exposing the workpieces to a laminer downward airflow to allow more appropriate solvent vapor removal.

The dip coat cell 30 also includes an exchange platform 36 for transferring the carrier pallet to the drying/cooling booth 50. The drying/cooling booth 50 may be comprised of a separate and discrete drying oven unit 52 and cooler unit 54. The drying/cooling booth includes a horizontal conveyor 56 for receiving the carrier pallet 12 from the dip cell 30 via exchange platform 36. No vertical transport system is required in the drying/cooling booth 50 as each carrier pallet 12 is merely transported horizontally through the drying oven 52 and through the cooling booth 54 for predetermined specified periods of time. In the preferred embodiment, the temperature of the drying oven 52 will be controllable within a range between 80° and 190° C. while the cooler will provide inlet air which is capable of being cooled to 18° C. or less. The drying/cooling booth 50 will preferably meet class 100 clean room industry standards just as the dip coating cell 30.

Figure 7:
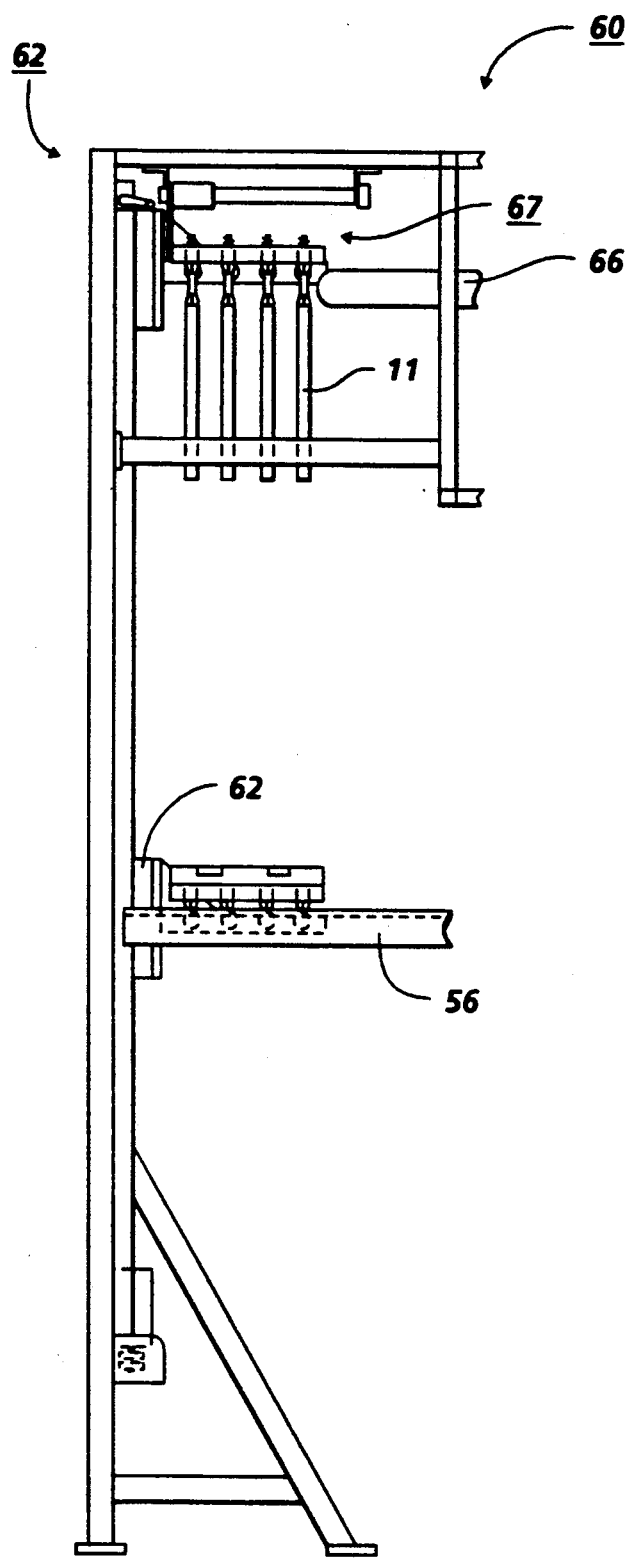
FIG. 7 is a schematic side view showing a return elevator of the dip coal process material handling system of FIG. 1.

As previously indicated, the described embodiment of the present invention further includes a carrier pallet return system, generally indicated in FIGS. 1 and 2 by reference numeral 60, and illustrated in detail in FIG. 7. The carrier pallet return system includes an elevator system comprising an input elevator 62 and an output elevator 64 as well as a return conveyor 66. The input elevator 62 is adapted for receiving the carrier pallet 12 from the dryer/cooling booth 50 to thereafter transport the carrier pallet 12 to the return conveyor 66. The return conveyor 66 transports the loaded carrier pallet 12 back to the dip coating cell via output elevator 64. Thus, the carrier pallet return system 60 provides a framework for returning the carrier pallet 12 to the dip vertical transfer system 42 for subsequent transport through the dip coating cell 30 to permit further dip coating. Alternatively, after the carrier pallet 12 is returned to the dip coating cell 30 the carrier pallet 12 can be transferred to the pallet load/unload station 10 via the horizontal and vertical transport lifts thereof, where the workpieces can be removed for post dip coat processing. In a preferred embodiment, the return conveyor assembly 60 includes an absolute filtered air recirculation system (not shown) for passing air over the workpieces as they are returned to the commencement of the dip cell 30. The return conveyor assembly 60 may also include an air driven transfer arm 67 for transferring the carrier pallet 12 from the input elevator to the return conveyor 66. Although the carrier pallet return system 60 is shown herein as a structure that carries the workpieces superjacent to the dip coating cell 30, It will be understood that the input and output elevators 62, 64 of this system 60 can be eliminated by positioning the return conveyor 66 directly adjacent to the dip coating cell 30. However, this alternative configuration would be disadvantageous in terms of real estate requirements as well as costs related to the size of the required class 100 clean room environment.

The dip coat process enabled by the present invention will now be described with reference to all of the FIGS. and the structural elements described herein.

In an initial step, workpieces 11 are delivered to the load pallet 16 at the load/unload station 10. The workpieces are then elevated by means of the loading pallet vertical lift 20 and mounted onto each individual mandrel 14 of the carrier pallet 12 via the chucking device 15 associated with each mandrel, operating in cooperation with the engage/disengage apparatus 18.

The loaded carrier pallet is subsequently transported from the load/unload station 10 along the pallet horizontal transport system 22 to the dip coating cell 30. Preferably, the workpieces will be transported through an air curtain into the class 100 clean room environment of the dip coating cell 30 where the loaded carrier pallet 12 is transferred to a first horizontal transfer cart 33 of the dip horizontal transfer system 32. The first dip horizontal transfer cart 33 transports the loaded carrier pallet 12 into position over a predetermined dip station 40. At this point, the carrier pallet 12 is transferred to the dip vertical transfer system 42 corresponding to the specific dip station 40 via a transfer system 43. The dip vertical transport 42 receives the carrier pallet 12 from the first dip horizontal transfer cart 33 and lowers the loaded carrier pallet 12 into the dip coating tank 44. Meanwhile, the first horizontal dip transfer cart 33 returns to its initial position for receiving subsequent carrier pallets 12, thereby providing a parallel processing capability within the dip coating cell 30. After a predetermined amount of time, the carrier pallet 12 that has been lowered down into the dip tank 44 is elevated by means of the dip vertical transfer system 42 and returned to the dip horizontal transfer system 32. At this point, the second dip horizontal transfer cart 34 is moved into position for receiving the carrier pallet 12 from the dip vertical transport 42 and transports the loaded carrier pallet to the flash-off station 48.

After sufficient solvent dissipation at the flash-off station, the carrier pallet 12 is transferred to the horizontal conveyor 56 of drying/cooling booth 50 via exchange platform 36 and subsequently to the return conveyor assembly 60 which returns the loaded carrier pallet to the commencement point of the dip coating cell 30. The loaded carrier pallet 12 is then either re-transported through the dip coating cell 30 for subsequent dip coating and application of subsequent layers of material onto the workpieces at any of the other various dip stations 40 within the dip coating cell 30, or is returned to the pallet load/unload station via the carrier pallet horizontal transfer system 22 where the workpieces can be removed from the carrier pallet 12 by disengaging the chucking device 15 via engage/disengage apparatus 18. The processed workpieces are then transferred to various other post-processing stations which may include a laser ablation station for removing dip coating layers from the inside and outside diameters along the bottom of the workpieces.

While the description of the operation of the present invention is directed toward a system that recycles workpieces through the dip cell for multi-layer processing, It will be recognized that various dip coat processes may be implemented through the use of the present invention. For example, in a single-layer dip coating process, the workpieces can be unloaded from the carrier pallet immediately subsequent to the drying/cooling booth such that the process of returning the workpieces to the dip cell can be eliminated. Further, it is contemplated that multiple dip cells can be placed in an in-line configuration, each separated by a drying/cooling booth if necessary, such that multiple layer processing can be accomplished without the need for returning the workpieces to the commencement point of a single dip cell for further processing therethrough, as shown in the present embodiment. In these examples, the return conveyor assembly would be utilized to return empty carrier pallets to the load/unload station for subsequent loading and further use. In addition, the return conveyor could be used as a staging area for installing mandrels and chucks of various sizes to meet production specifications.

It will be evident by those of skill in the art that the control operation of the present invention can be carried out either manually or by various automatic systems which may include various sensing devices coupled to a central programmable logic control unit (PLC) (not shown) or to a series of independent PLC's for providing semi-automatic processing capability. One such control operation systems is the PLC-5 series programmable controller including input/output modules available through Allen-Bradley Company of Milwaukee, Wis. which permits entering and changing process parameters, such as set points, alarm limits, and data table volumes, among other specific parameters through a programming panel and associated software. This control system should also provide all temperature control and timing functions.

It will be seen from the foregoing discussion of operation, that the present invention provides a flexible manufacturing system in which workpieces, and in particular, hollow pipes, can be transported through a dip coat process material handling system without having to be loaded and unloaded at each dip coating process point. The dip coat process handling system of the present invention also provides flexibility and modularity to allow for production of multiple products by interchanging dip tanks having various solutions therein and/or allows for the co-processing of various workpieces having variable diameters or dimensions. By allowing each workpiece to be handled from the top edge, the present invention also eliminates the need to bottom edge wipe each workpiece after each coating step, as required by the prior art.

In recapitulation, the dip coat material handling system of the present invention includes a load/unload station, a dip coating cell, a dryer/cooling booth and a return conveyor assembly for processing a plurality of workpieces for coating multiple layers of material thereon. The material handling system includes a carrier pallet having a plurality of mandrels for suspending the workpieces from the carrier pallet so that the entire dip coating process can be accomplished with the workpieces attached to the carrier pallet.

It is therefore evident that there has been provided, in accordance with the present invention, a process material handling system that fully satisfies the aims and advantages of the invention as hereinabove set forth. While this invention has been described in conjunction with preferred embodiments thereof, it is evident that many alternatives, modifications, and variations will be apparent to those skilled in the art. Accordingly, the present application for patent is intended to embrace all such alternatives, modifications and variations as are within the broad scope and spirit of the appended claims.

We claim:

1. A material handling system for dip coating a plurality of workpieces to deposit a layer of coating material thereon, comprising:
    carrier means for receiving the plurality of workpieces;
    means for elevating the workpieces in a single plane to load the workpieces onto said carrier means;
    a dip station for depositing a layer of coating material onto each of the plurality of workpieces;
    first transport means for transporting said carrier means in a first plane to position the workpieces over said dip station; and
    second transport means for transporting said carrier means in a second plane substantially perpendicular to the first plane to transport the workpieces into and out of said dip station with the workpieces attached to said carrier means; and
    means for transferring said carrier means between said first transport means and said second transport means.

2. The material handling system of claim 1, wherein said first transport means includes a horizontal transport for transporting said carrier means in a substantially horizontal plane; and
    said second transport means includes a vertical transport for transporting said carrier means in a substantially vertical plane.

3. The material handling system of claim 2, wherein said vertical transport means includes means for transferring said carrier means between said horizontal transport means and said vertical transport means.

4. The material handling system of claim 2, wherein said horizontal transport means includes:
    a first horizontal transport cart for transporting said carrying means to said vertical transport means; and
    a second horizontal transport cart for transporting said carrying means away from said vertical transport means.

5. The material handling system of claim 4, further including means for returning said carrier means to said first horizontal transport cart so as to permit subsequent processing of the workpieces.

6. The material handling system of claim 1, wherein said carrier means includes:
    a carrier pallet;
    a plurality of mandrels mounted on said carrier pallet; and
    a chucking device mounted on each of said plurality of mandrels for securing a workpiece into position on said carrier pallet so as to be suspended therefrom.

7. The material handling system of claim 1, wherein said dip station includes a plurality of individual dip tanks for containing the coating material to individually receive the plurality of workpieces therein so as to immerse the workpieces in the coating material.

8. The material handling system of claim 1, further including a flash-off station for allowing solvent vapors to dissipate from the workpieces after dipping the workpieces into and out of the dip station.

9. The material handling system of claim 1, further including a load/unload station for loading workpieces onto and unloading workpieces from said carrier means.

10. The material handling system of claim 8, wherein said load/unload station includes a load for receiving the plurality workpieces to align the workpieces for loading onto said carrier means.

11. The material handling system of claim 10 wherein said load/unload station includes means for elevating said load pallet to load the workpieces onto said carrier means.

12. The material handling system of claim 9, wherein said load/unload station includes an engage/disengage apparatus for simultaneously engaging or disengaging the plurality of workpieces with said carrier means.

13. The material handling system of claim 9, wherein said load/unload station includes a load transport means for transporting said carrier means from said load/unload station to said first transport means.

14. The material handling system of claim 13, wherein said load/unload station includes means for transferring said carrier means from said load transport means to said first transport means.

15. The material handling system of claim 1, further including means for drying the workpieces.

16. The material handling system of claim 15, wherein said drying and cooling means includes a horizontal transport conveyor for transporting said carrier means therethrough.

17. The material handling system of claim 16, further including means for transferring said carrier means from said first transport means to said horizontal transport conveyor of said drying and cooling means.

18. A material handling system for dip coating a plurality of workpiece to deposit a layer of coating material thereon, comprising:

carrier means for receiving the plurality of workpieces;

means for elevating the workpieces in a single plane to load the workpieces onto said carrier means;

a dip station for depositing a layer of coating material onto each of the plurality of workpieces;

first transport means including a horizontal transport for transporting said carrier means in a substantially horizontal plane to position the workpieces over said dip station, said horizontal transport including a first horizontal transport cart for transporting said carrying means to said vertical transport means; and a second horizontal transport cart for transporting said carrying means away from said vertical transport means;

second transport means including a vertical transport for transporting said carrier means in a substantially vertical plane to transport the workpieces into and out of said dip station with the workpieces attached to said carrier means; and means for returning said carrier means to said first horizontal transport cart so as to permit subsequent processing of the workpieces, said returning means including a return conveyor for transporting said carrier means to said first horizontal transport cart;

an input elevator for lifting said carrier means to said return conveyor; and an output elevator for lowering said carrier means onto said horizontal transport means.

19. The material handling system of claim 1, further including means for cooling the workpieces.

20. The material handling system of claim 1, wherein the workpieces are hollow drums, each having an exterior surface and an interior surface, and said carrier means includes means for frictionally contacting the interior surface of the hollow drums to suspend the hollow drums from said carrier means.

* * * * *